United States Patent
Dickey et al.

(10) Patent No.: US 9,980,277 B2
(45) Date of Patent: May 22, 2018

(54) ZIGBEE, THREAD AND BLE CO-EXISTENCE WITH 2.4 GHZ WIFI

(71) Applicant: Silicon Laboratories, Inc., Austin, TX (US)

(72) Inventors: Terry Lee Dickey, Austin, TX (US); Christopher L. McCrank, Austin, TX (US); Jesse Ira Masters, Austin, TX (US); Donald Miner Markuson, Framingham, MA (US); Micah Solomon Evans, Boston, MA (US)

(73) Assignee: Silicon Laboratories, Inc., Austin, TX (US)

( * ) Notice: Subject to any disclaimer, the term of this patent is extended or adjusted under 35 U.S.C. 154(b) by 116 days.

(21) Appl. No.: 15/084,125

(22) Filed: Mar. 29, 2016

(65) Prior Publication Data

US 2017/0290035 A1 Oct. 5, 2017

(51) Int. Cl.
*H04W 72/12* (2009.01)
*H04L 1/16* (2006.01)
*H04W 72/14* (2009.01)
*H04W 88/06* (2009.01)

(52) U.S. Cl.
CPC ....... *H04W 72/1215* (2013.01); *H04L 1/1685* (2013.01); *H04W 72/14* (2013.01); *H04W 88/06* (2013.01); *Y02D 70/00* (2018.01); *Y02D 70/142* (2018.01); *Y02D 70/144* (2018.01); *Y02D 70/162* (2018.01)

(58) Field of Classification Search
CPC ..... H04W 84/12; H04W 4/008; H04W 88/02; H04L 63/061; H04L 41/0816; H04L 63/0435; H04L 63/0442
See application file for complete search history.

(56) References Cited

U.S. PATENT DOCUMENTS

| | | | | |
|---|---|---|---|---|
| 2005/0063416 | A1* | 3/2005 | Shin | H04W 88/06 370/465 |
| 2008/0287158 | A1* | 11/2008 | Rayzman | H04W 72/06 455/552.1 |
| 2011/0310741 | A1* | 12/2011 | Ko | H04W 84/12 370/235 |
| 2017/0290038 | A1 | 10/2017 | Dickey et al. | |
| 2017/0325252 | A1 | 11/2017 | Dickey et al. | |

OTHER PUBLICATIONS

"AR6102 Wi-Fi solution designed for portable consumer electronics devices," Qualcomm, 3 pages, 2013.
"Single-Chip IEEE 802.11 big/n MAC/Baseband/Radio + SDIO," Data Sheet, Broadcom Corporation, 82 pages, Feb. 13, 2015.
"IEEE Standards 802.15.2 Part 15.2: Coexistence of Wireless Personal Area Networks with Other Wireless Devices Operating in Unlicensed Frequency Bands," IEEE Computer Society, 115 pages, Aug. 28, 2003.

* cited by examiner

*Primary Examiner* — Jung Park
(74) *Attorney, Agent, or Firm* — Nields, Lemack & Frame, LLC

(57) ABSTRACT

A system and method of minimizing interference and retries in an environment where two or more network protocols utilize the same frequency spectrum is disclosed. A lower-power network controller is co-located with a WIFI controller. The lower-power network controller parses incoming packets as they are received and generates a request signal once it is determined that the incoming packet is destined for this device. This maximizes the likelihood that no WIFI traffic will occur while the incoming packet is being received.

13 Claims, 13 Drawing Sheets

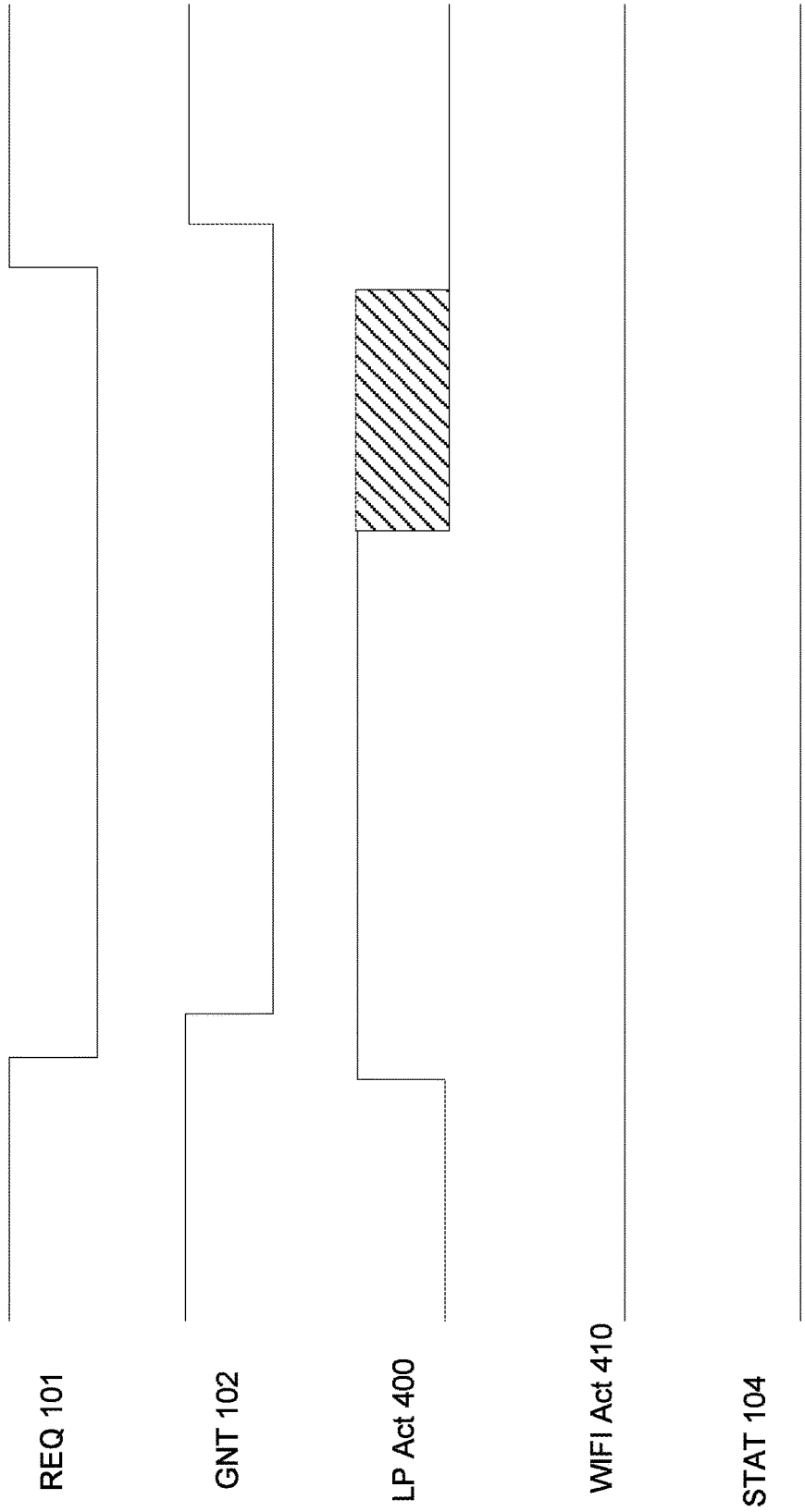

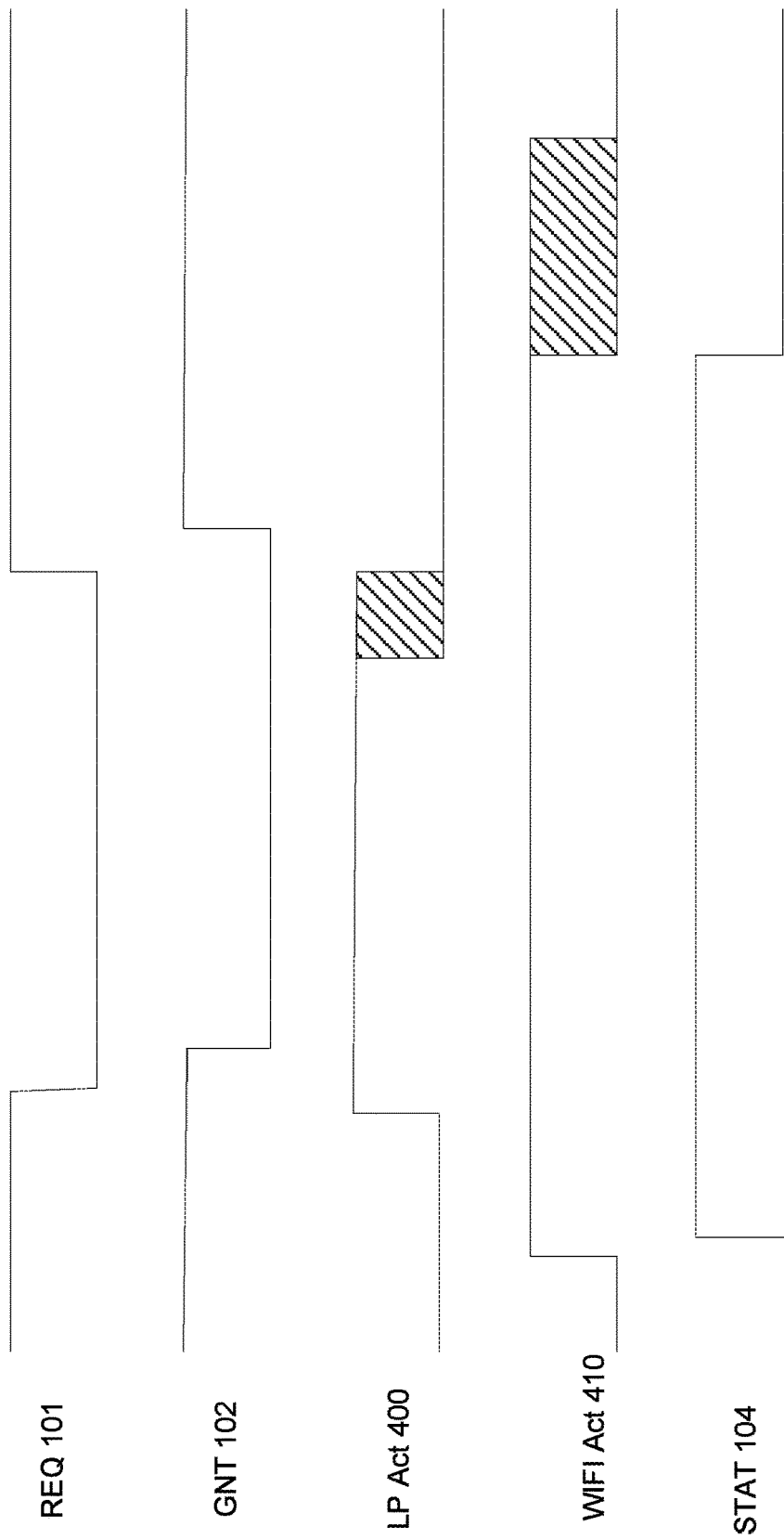

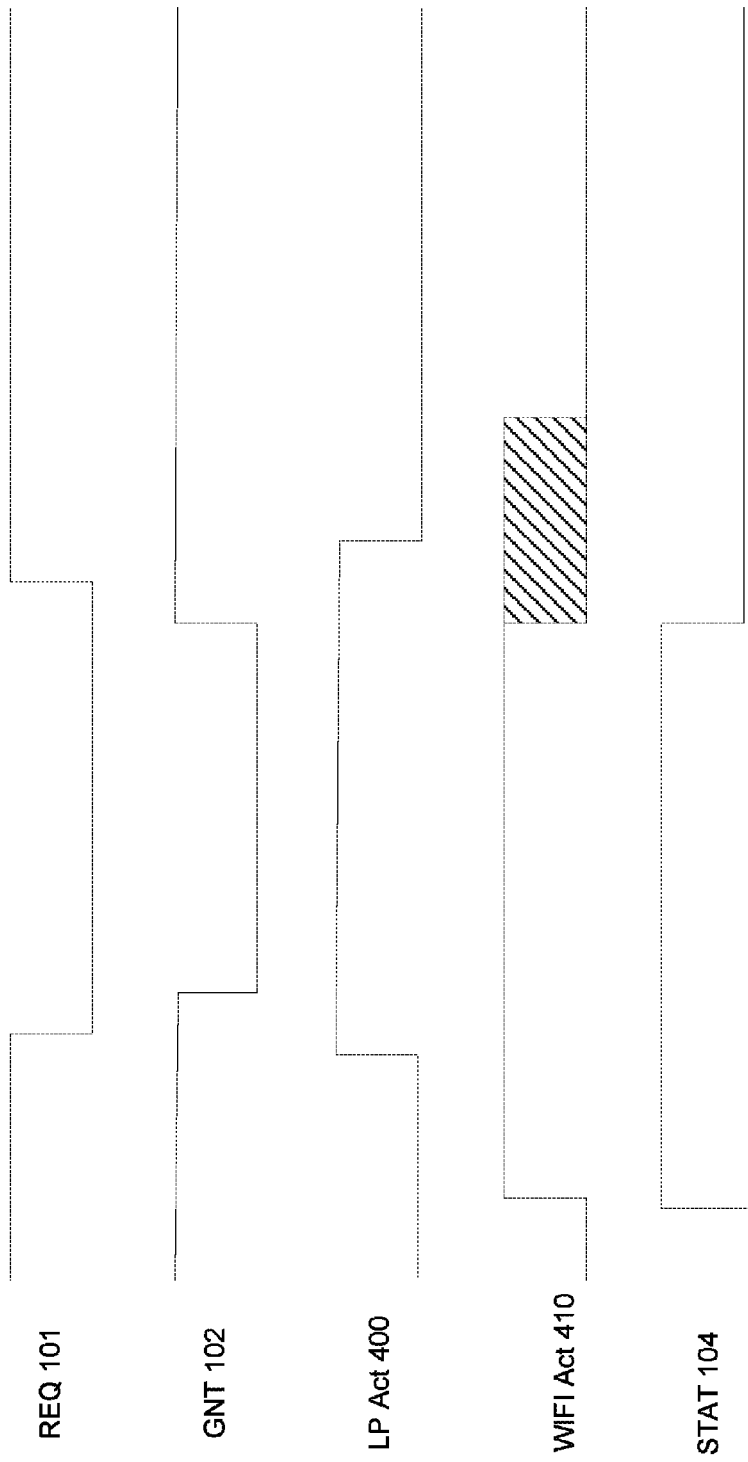

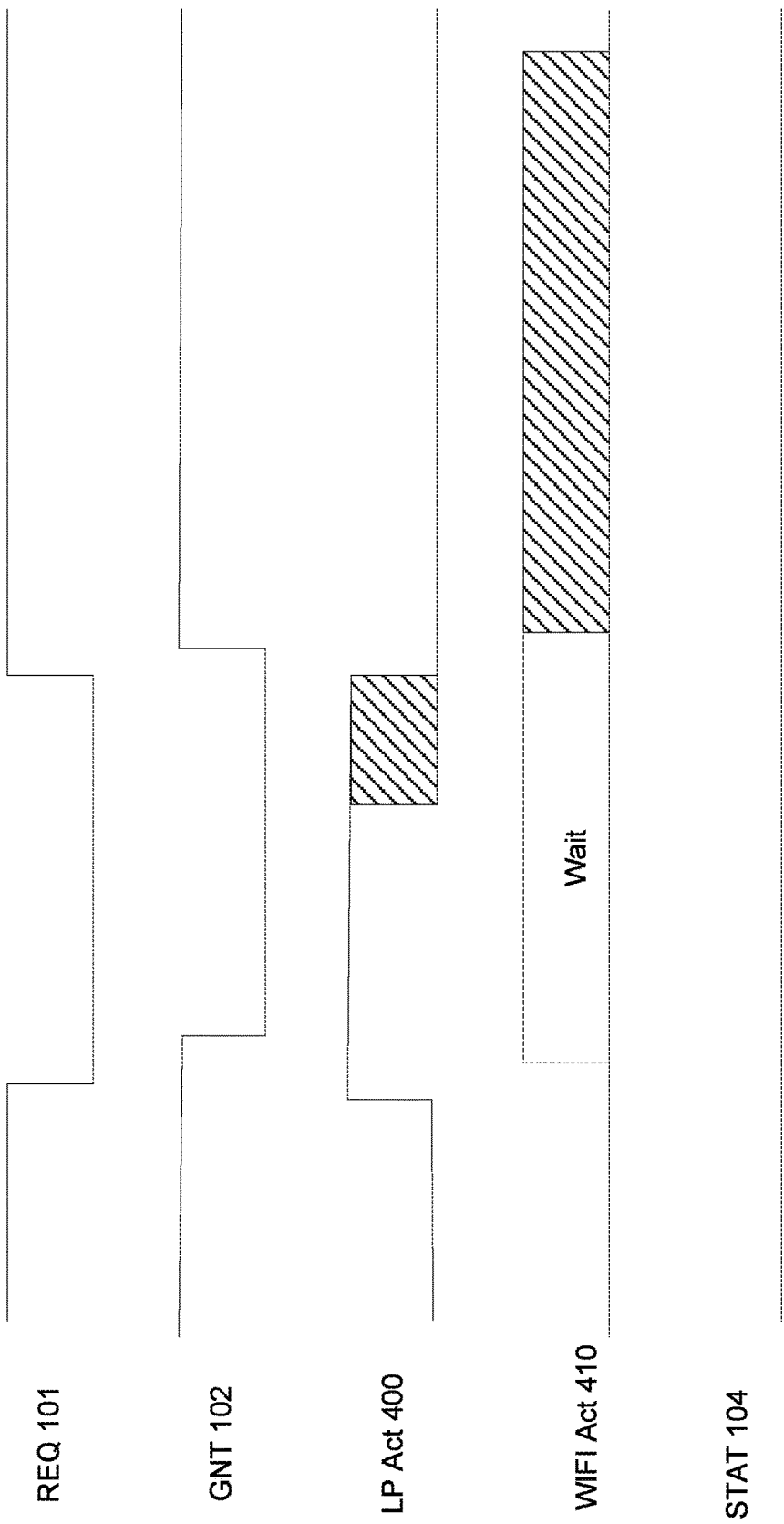

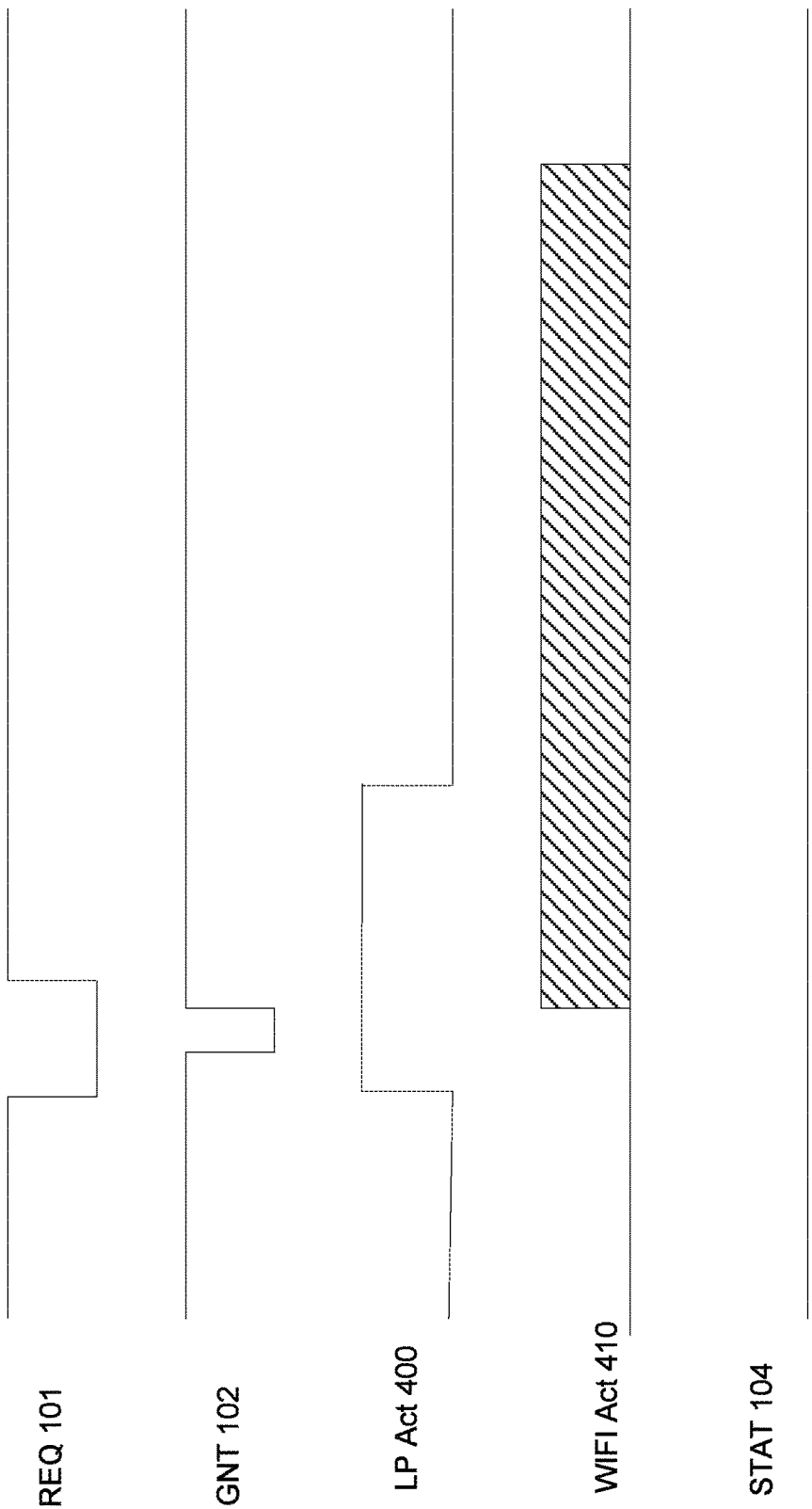

ZIGBEE, THREAD AND BLE CO-EXISTENCE WITH 2.4 GHZ WIFI

This disclosure describes systems and methods allowing the co-existence of multiple network protocols in close proximity to one another, and more specifically, the co-existence of ZigBee, Thread or Bluetooth and 2.4 GHz WiFi.

BACKGROUND

The proliferation of networks, especially in the 2.4 GHz frequency band, has led to challenges for those attempting to utilize multiple network protocols. For example, ZigBee, Thread and BlueTooth Low Energy all operate in the 2.4 GHz spectrum, and are considered low power protocols. However, WiFi, which has much higher transmission power levels, also operates in this frequency spectrum. Consequently, these various protocols may interfere with one another, resulting in reductions in throughput or data loss.

However, currently, most solutions to this problem are unmanaged, meaning that customers are asked to maximize RF isolation. This may be done by attempting to physically separate the antennas associated with each network protocol. Alternatively or additionally, the networks may be set up on separate channels within the 2.4 GHz frequency spectrum to attempt to reduce isolation requirements. Finally, the number of retries allowed for each network protocol may be maximized, thereby using retransmissions to serve as a safety net in case the other techniques do not yield the required RF isolation.

In addition, recent market trends are to reduce the space required to implement these various protocols. One way of doing this is to co-locate multiple antennas within a single device. For example, gateways and other devices that include WiFi and one or more other network protocols are becoming increasingly popular.

The unmanaged approaches that are currently used are insufficient to address these issues associated with co-existence of multiple network protocols. Therefore, there is a need for a more managed and planned approach to co-located networks which operate in the same frequency spectrum.

SUMMARY

A system and method of minimizing interference and retries in an environment where two or more network protocols utilize the same frequency spectrum is disclosed. A lower-power network controller is co-located with a WIFI controller. The lower-power network controller parses incoming packets as they are received and generates a request signal once it is determined that the incoming packet is destined for this device. This maximizes the likelihood that no WIFI traffic will occur while the incoming packet is being received.

In one embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: parse a lower-power network packet as it is received; identify that the lower-power network packet is destined for this controller as it is being received; and assert the request signal if the lower-power network packet is destined for this controller, wherein the assertion is performed before the entire packet has been received. In certain embodiments, the lower-power network controller is further configured to transmit an acknowledgement packet after the lower-power network packet has been received only if the grant signal is active. In some embodiments, the WIFI controller and the lower-power network controller operate in the same frequency spectrum. In certain embodiments, the WIFI controller further comprises a status signal used as an output to indicate whether the WIFI controller is active. In certain embodiments, the lower-power network controller is further configured to not transmit an acknowledgement packet after the lower-power network packet has been received if the grant signal is not active or the WIFI controller is active.

In another embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: assert the request signal when the lower-power network controller determines that a lower-power network packet is being received; parse the lower-power packet to determine if the packet is destined for this controller; and deassert the request signal if it is determined that the lower-power network packet is not destined for this controller. In certain embodiments, the lower-power network packet comprises a header containing a destination address, and the request signal is deasserted by the lower-power network controller after receiving the destination address and determining that the lower-power network packet is not destined for this controller.

In another embodiment, a system is disclosed. The system comprises a WIFI controller, comprising a request signal used as an input to request exclusive access to a shared medium and a grant signal used as an output indicating that the exclusive access to the shared medium has been granted; and a lower-power network controller, comprising a processing unit and an associated memory element, wherein the lower-power network controller is configured to: determine when there is a lower-power packet to transmit; calculate a random delay to be used by the lower-power network prior to attempting to transmit the packet on the shared medium; and assert the request signal a predetermined amount of time after determining that there is a lower-power packet to transmit, wherein the predetermined amount of time is determined based on the random delay. In certain embodiments, the predetermined amount of time is less than the random delay by a predetermined value.

BRIEF DESCRIPTION OF THE DRAWINGS

For a better understanding of the present disclosure, reference is made to the accompanying drawings, in which like elements are referenced with like numerals, and in which:

FIG. 4A-4G are timing diagrams representing different scenarios;

DETAILED DESCRIPTION

Figure 1:
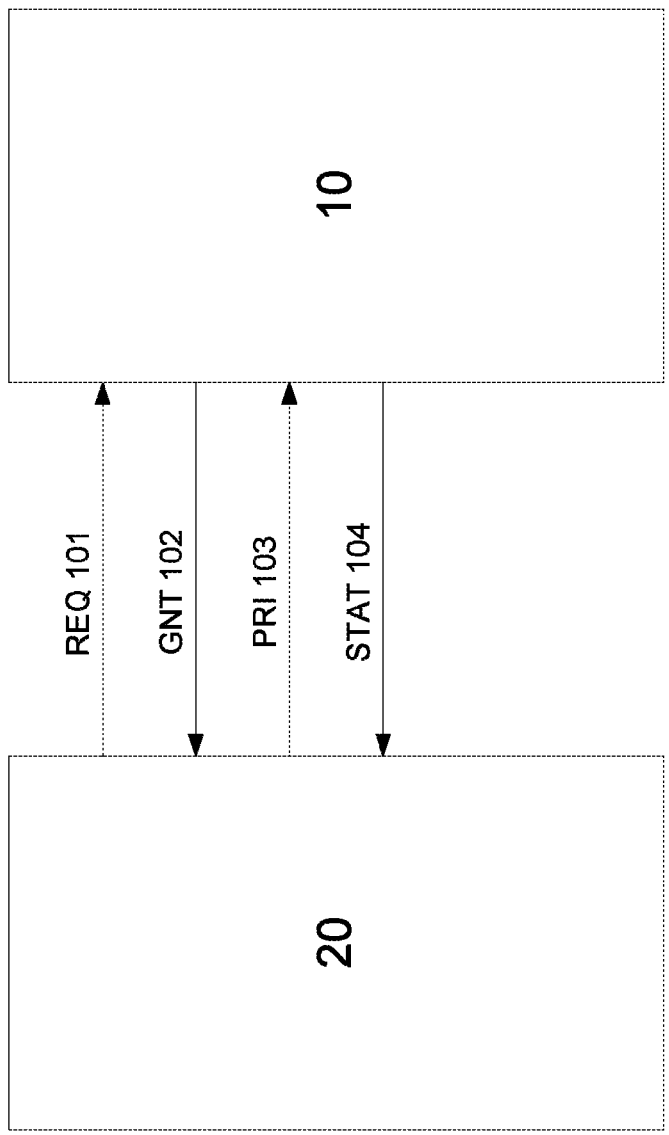
FIG. 1 is a block diagram of a system having both a WIFI controller and a lower-power network controller.

FIG. 1 shows a block diagram of a system having a WIFI network controller and a lower-power network controller. Throughout this disclosure, the term "lower-power network" is used to refer to any network protocol that operates in the same frequency spectrum as the WIFI network, and uses lower power. For example, ZIGBEE®, Thread, Bluetooth®, and Bluetooth Low Energy (BLE) all operate in the same 2.4 GHz frequency spectrum as WiFi. Other network protocols layered on IEEE 802.15.4 would also operate in the 2.4 GHz frequency spectrum. Further, although reference is made throughout this disclosure to 2.4 GHz, it is understood that the techniques and systems described herein are applicable to any frequency spectrum where both high power devices and lower power network co-exist.

FIG. 1 shows a WIFI controller 10 and a lower-power network controller 20. While FIG. 1 shows these devices as being two separate devices, it is understood that in certain embodiments, these devices may be incorporated into a single integrated circuit. Thus, FIG. 1 illustrates the interface between these components, regardless of the physical implementation of these components.

Within the IEEE 802.15.2 standard, an arbitration mechanism is defined. This mechanism, known as Packet Traffic Arbitration (PTA), allows other lower-power network controllers to request access to the shared medium from the WIFI controller. The shared medium is typically the air. The mechanism includes a request signal (REQ) 101 which in an indication from the lower-power network controller 20 that it wishes to access the shared medium. The protocol also includes a grant signal (GNT) 102, indicating that the WIFI controller 10 has allowed another device to use the shared medium. In certain embodiments, the mechanism includes a priority signal (PRI) 103, which is used to indicate the importance of the packet that the lower-power network controller 20 wishes to transmit. Finally, in certain embodiments, the mechanism includes a status signal (STAT) 104, which indicates the status of the WIFI controller 10. In certain embodiments, this STAT signal 104 may be asserted when the WIFI controller 10 is receiving a packet and deasserted at all other times. In other embodiments, the STAT signal 104 may be asserted whenever the WIFI controller 10 is transmitting or receiving.

Further, while FIG. 1 shows the arbitration logic contained within the WIFI controller, other embodiments are also possible. For example, the packet arbitration logic may be a separate component, separate from the lower-power network controller 20 and the WIFI controller 10.

Traditionally, the lower-power network controller 20 asserts the REQ signal 101 whenever it wishes to transmit a packet over the shared medium. In response, the WIFI controller 10 asserts the GNT signal 102 when it is no longer active. After the lower-power network controller 20 has completed transmitting its packet, it then deasserts the REQ signal 101, indicating that it no longer needs access to the shared medium. The WIFI controller 10 then deasserts the GNT signal 102.

However, this mechanism has drawbacks. For example, if the lower-power network controller 20 is receiving a packet, and the WIFI controller 10 begins transmission of a new packet during that reception, it is likely that the packet being received by the lower-power network controller 20 will be corrupted. Further, even if the incoming packet is not corrupted, the lower-power network controller 20 will be unable to transmit an acknowledgement (ACK) back to the transmitting node. Consequently, even if the lower-power network packet were successfully received, it will be treated as a failure and retries will be incurred.

The present disclosure proposes a unique usage of the PTA mechanism to reduce retries and interference, with minimal impact on WIFI performance.

Figure 2:
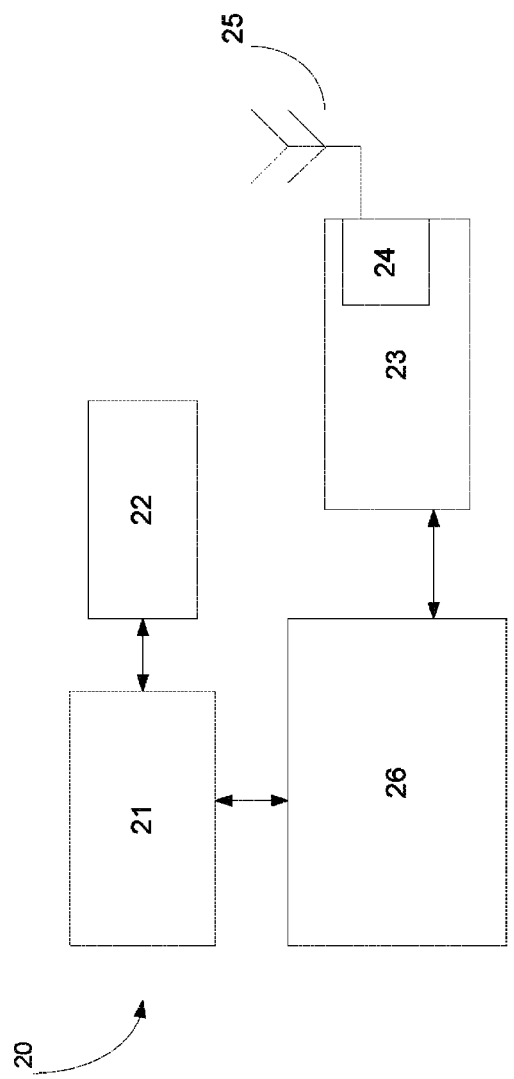
FIG. 2 is a block diagram of the lower-power network controller.

FIG. 2 shows a block diagram of a representative lower-power network controller 20. The lower-power network controller 20 has a processing unit 21 and an associated memory device 22. This memory device 22 contains the instructions, which, when executed by the processing unit, enable the lower-power network controller 20 to perform the functions described herein. This memory device 22 may be a non-volatile memory, such as a FLASH ROM, an electrically erasable ROM or other suitable devices. In other embodiments, the memory device 22 may be a volatile memory, such as a RAM or DRAM. The lower-power network controller 20 also includes a network interface 23, which is typically a wireless interface including an antenna 25. Additionally, the network interface may comprise a radio 24, which includes the baseband processing and MAC level processing. The lower-power network controller 20 may include a second memory device 26 in which data that is received by the network interface 23, and data that is to be transmitted by the network interface 23, is stored. This second memory device 26 is traditionally a volatile memory. The processing unit 21 has the ability to read and write the second memory device 26 so as to communicate with the other nodes in the network. Although not shown, each lower-power network controller 20 also has a power supply, which may be a battery or a connection to a permanent power source, such as a wall outlet.

Figure 3:
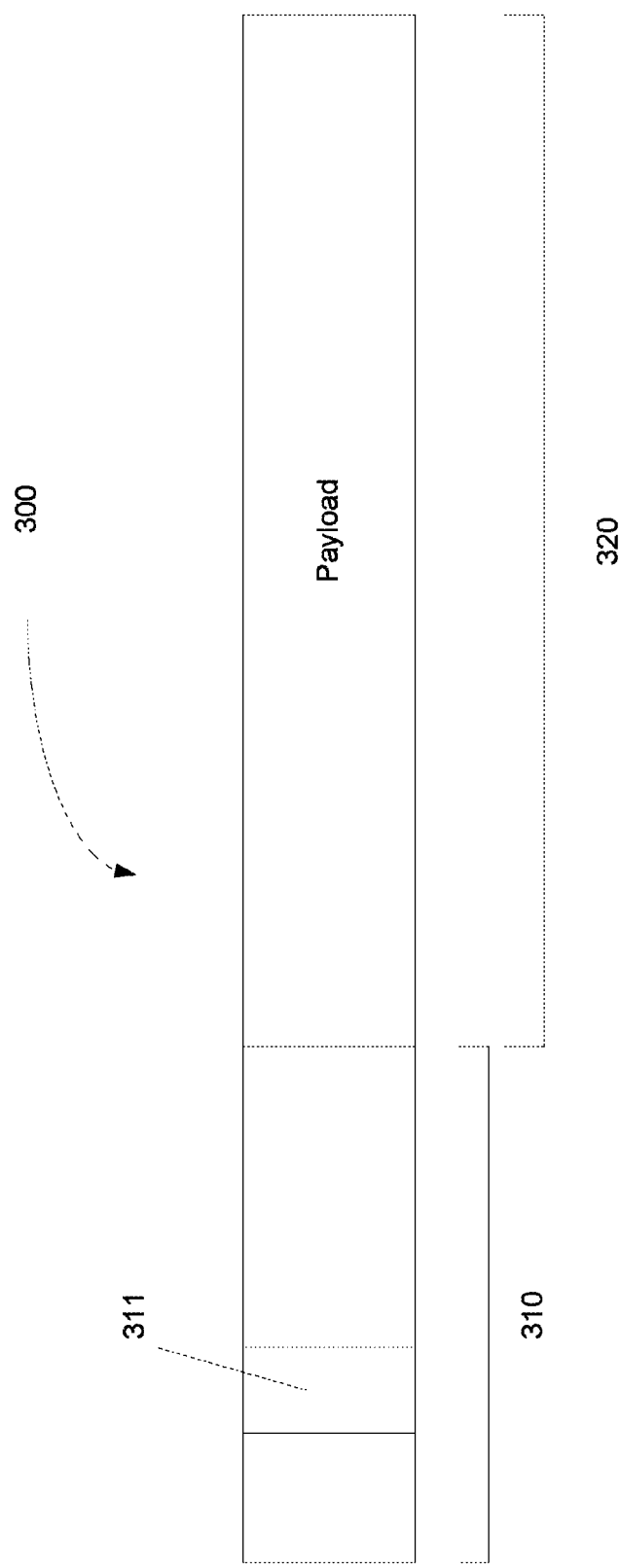
FIG. 3 is a representative lower-power network packet.

FIG. 3 shows a typical incoming packet from a lower-power network. The packet 300 includes a header 310 and a payload 320. The header 310 may further include a destination address 311. The destination address 311 is a representation of the device to which this packet is intended. For example, each lower-power network device may have a unique network identifier, which is used as the destination address. The header 310 may also include other fields, and the disclosure does not limit the other components which comprise the header.

When a packet 300 is transmitted over the lower-power network, the receiving device may be requested to positively acknowledge receipt of the packet by transmitting an Acknowledgement (ACK) packet back to the sending device as soon as receipt is completed. Failure to transmit this ACK successfully will be treated as a failed transmission by the sending device.

FIGS. 4A-4G represent various timing diagrams that illustrate the operation of the present system in different scenarios. In these diagrams, the REQ signal 101 and the GNT signal 102 are active low, meaning that they are asserted when they are at the lower voltage and are inactive at the higher voltage.

The LP Act signal 400 represents lower-power network activity. Incoming packets are represented by an assertion of the LP Act signal 400. Outgoing communications are represented by the cross-hatched regions.

The WIFI Act signal 410 represents WIFI network activity. Incoming packets are represented by an assertion of the WIFI Act signal 410. Outgoing communications are represented by the cross-hatched regions.

The STAT signal 104 is used to represent the status of the WIFI controller 10. In certain embodiments, the STAT signal 104 is not used. In other embodiments, the STAT signal 104 is used to denote any activity, such as receiving and transmitting, by the WIFI controller 10. In the present timing diagrams, the STAT signal 104 is asserted when the WIFI controller 10 is receiving a packet, and is deasserted at all other times.

FIG. 4A shows a first timing diagram representing the receipt of a packet by the lower-power network controller 20, and the corresponding ACK that it transmitted by that device. In this scenario, there is no WIFI activity.

The sequence begins when a lower-power network packet is transmitted to this device, as shown in the LP Act signal 300.

Sometime after the start of the reception of this packet, the lower-power network controller 20 asserts the REQ signal 101. More specifically, as the packet arrives, the lower-power network controller 20 begins parsing the packet. Once the destination address 311 has been received, the lower-power network controller 20 can determine whether the incoming packet is intended for this device. If the packet is not intended for this device, the lower-power network controller 20 may simply stop parsing the packet. However, if the packet is intended for this device, the lower-power network controller 20 will continue parsing the packet and will save the packet in its memory element 26. In one embodiment, the REQ signal 101 may be asserted as early as the completion of the receipt of the destination address 311. In yet another embodiment, the REQ signal 101 may be asserted immediately upon detection of the receipt of the first byte of a lower-power network packet 300. If that packet is not intended for this device as determined based on the destination address 311, the lower-power network controller 20 will deassert the REQ signal 101. In both embodiments, the REQ signal 101 is asserted as quickly as possible to maximize the probability that the WIFI controller 10 will assert the GNT signal 102 and will not begin transmission of a WIFI packet. In other words, the lower-power network controller 20 asserts the REQ signal 101 prior to the completion of the receipt of the incoming packet. As stated above, this may be as soon as the destination address 311 is parsed by the lower-power network controller 20; however, may be any time before the completion of the receipt of the incoming packet 300.

In certain embodiments, the parsing of the incoming packet 300 may be done by software executed by the processing unit 21. For example, the processing unit may read the information from the packet as it is received by network interface 23. It then asserts the REQ signal 101 as described above. In other embodiments, there may be dedicated hardware disposed within the radio 24 that performs this function. In either embodiment, the lower-power network controller 20 is adapted to parse the header to determine whether the packet is destined for this device, and to assert if the packet is indeed destined for this device.

After the REQ signal 101 is asserted, the WIFI controller 10 asserts the GNT signal 102, since there is no WIFI activity. At this point, the lower-power network packet will be received without interruption. Once received, the lower-power network controller 20 may transmit an ACK packet back to the sending device, as indicated by the cross-hatched region.

Once the ACK has been transmitted, the REQ signal 101 is then deasserted by the lower-power network controller 20. This causes the WIFI controller 10 to deassert the GNT signal 102, and the transaction is complete.

FIGS. 4B-4C show scenarios where a lower-power network packet 300 is being received at the same time that a WIFI packet is being received. In these embodiments, as described above, the lower-power network controller 20 asserts the REQ signal 101 as soon as it is determined that the incoming lower-power network packet 300 is destined for this device. In this scenario, the WIFI controller 10 is also receiving a packet and therefore, the STAT signal 104 is asserted. Additionally, since the WIFI controller 10 is not transmitting, the WIFI controller 10 asserts the GNT signal 102, indicating that the lower-power network controller 20 may transmit a packet if desired.

In FIG. 4B, the receipt of the lower-power network packet 300 is completed while the WIFI packet is still being received. In one embodiment, shown in FIG. 4B, the lower-power network controller 20, noting that the GNT signal 102 is asserted, transmits the ACK packet while the WIFI controller 10 is still receiving the incoming WIFI packet. This scenario may occur, for example, if the lower-power network controller 20 does not have access to any information about the status of the WIFI controller 10. In other words, if the PTA mechanism does not include a STAT signal 104, the lower-power network controller 20 uses only the GNT signal 102 to determine whether it can transmit the ACK packet.

In another embodiment, the lower-power network controller 20 has access to the STAT signal 104 and uses this information to determine whether to transmit the ACK packet. In this embodiment, the lower-power network controller 20, noting that the STAT signal 104 is asserted, will not transmit the ACK packet to the sending device. This may cause a retry of the lower-power network packet, but will allow the WIFI packet to be received without any interference caused by the transmission of an ACK packet.

In another embodiment, the WIFI controller 10 may be configured such that the GNT signal 102 is not asserted if the WIFI controller is transmitting or receiving. In this scenario, since the WIFI controller 10 is receiving a WIFI packet, the GNT signal 102 will not be asserted. Thus, the lower-power network controller 20 will not attempt to transmit an ACK packet. The scenario in which the GNT signal 102 is never asserted is shown later in FIG. 4D.

FIG. 4C shows a scenario where receipt of the WIFI packet is completed before completion of the lower-power network packet 300. In this scenario, the lower-power network controller 20 will assert the REQ signal 101 as soon as it is determined that the packet is intended for this device. Since the WIFI controller 10 is not transmitting a packet, it will assert the GNT signal 102. However, the WIFI controller 10 will deassert the GNT signal 102 after completion of the receipt of the incoming WIFI packet so that it may transmit an acknowledge. The deassertion of the GNT signal 102 will inform the lower-power network controller 20 that it cannot send the ACK packet back to the sending device. Thus, FIG. 4C does not illustrate an ACK packet being sent by the lower-power network controller 20. Again, this will likely result in a retry.

Figure 4D:
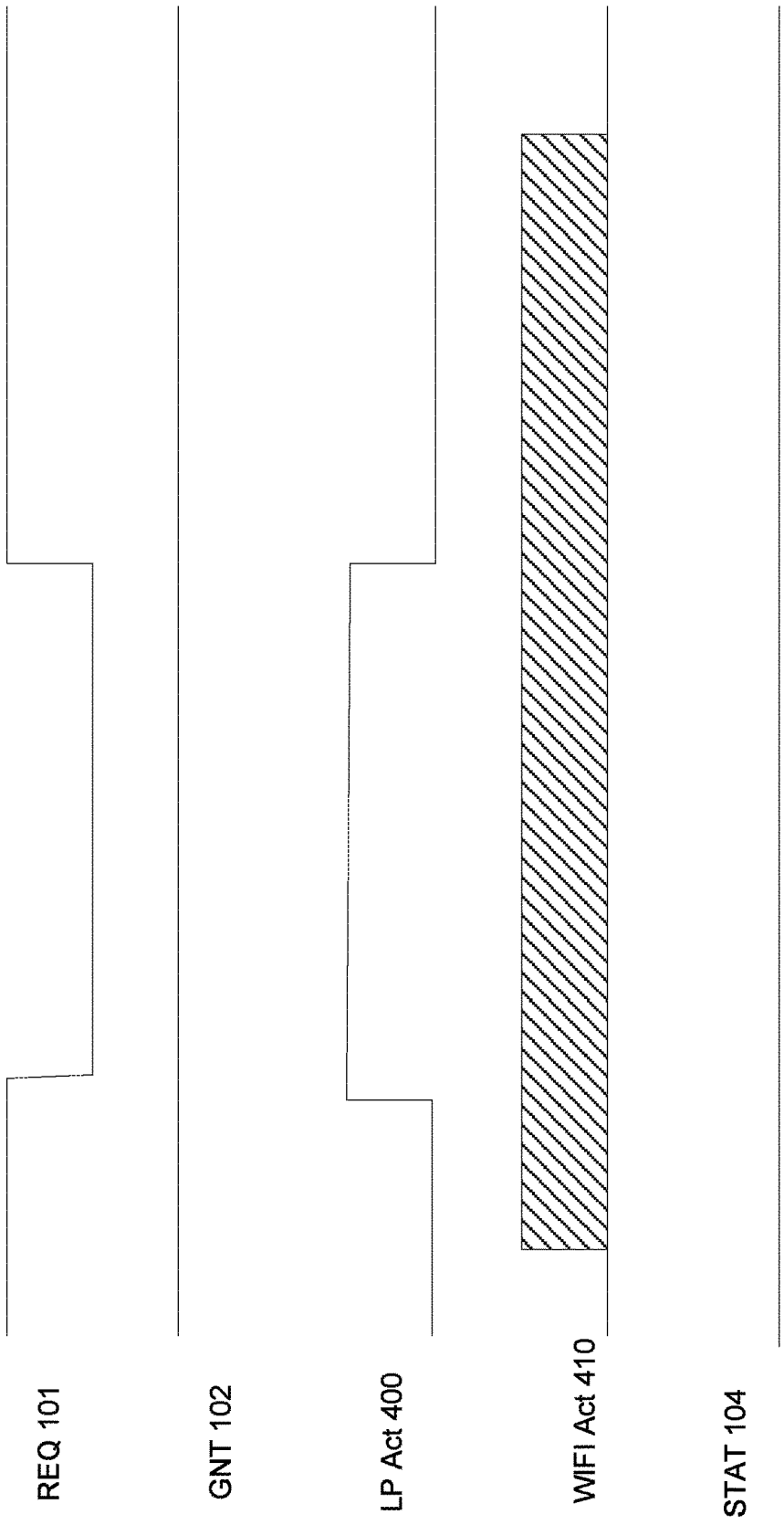
Figure 4E:
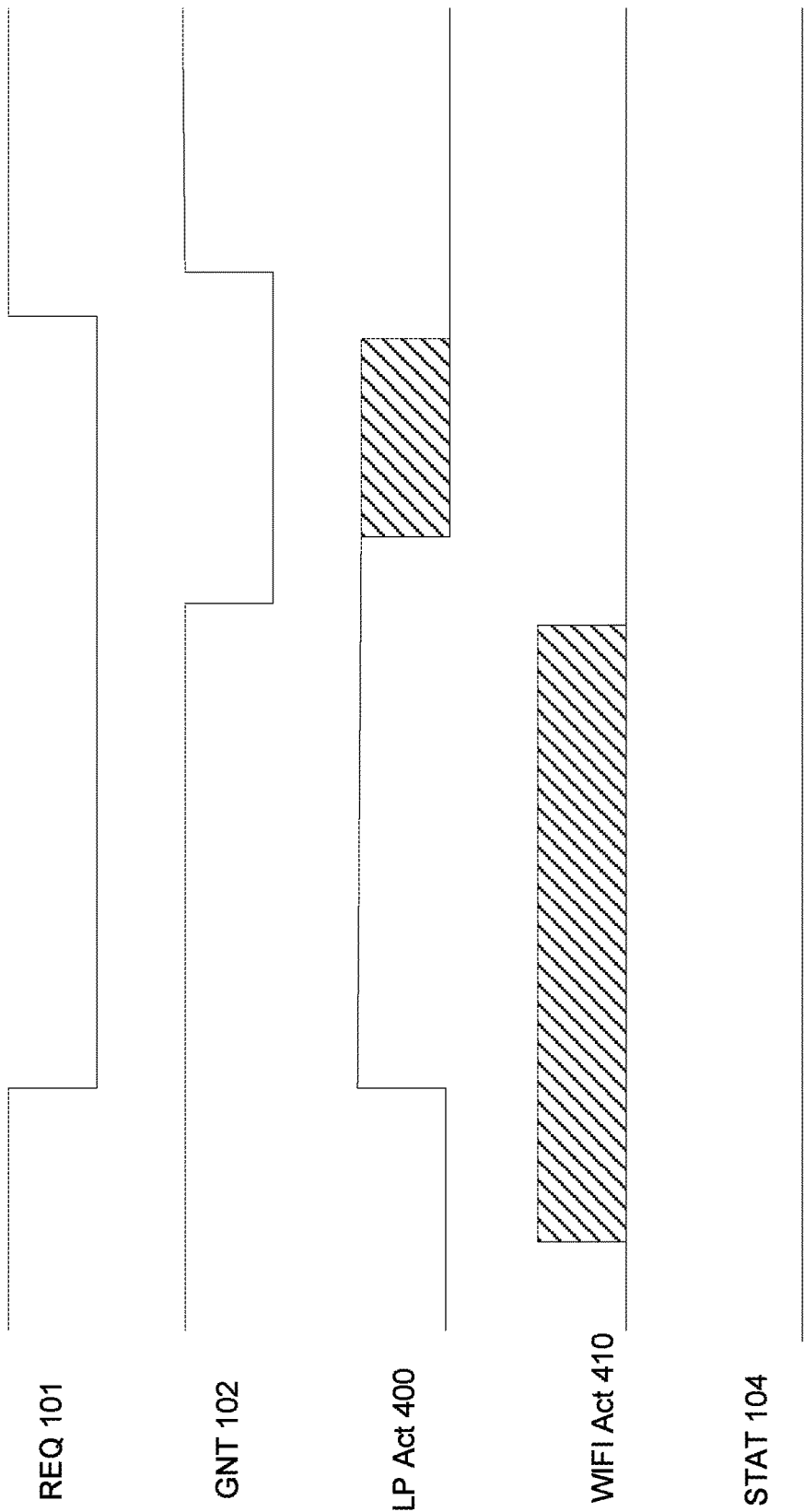

FIGS. 4D-4E show scenarios where a lower-power network packet 300 is being received at the same time that a WIFI packet is being transmitted. In these embodiments, as described above, the lower-power network controller 20 asserts the REQ signal 101 as soon as it is determined that the incoming lower-power network packet 300 is destined for this device. Since the WIFI controller 10 is transmitted, the GNT signal 102 is not asserted immediately.

In the embodiment shown in FIG. 4D, the WIFI controller 10 is still transmitting when the lower-power network controller 20 wants to transmit the ACK. However, the lower-power network controller 20 cannot transmit an ACK packet since the GNT signal 102 was never asserted. Thus, this lower-power network packet 300 will likely be retried since an ACK was never returned by the receiving device.

In the embodiment shown in FIG. 4E, the WIFI controller 10 was no longer transmitting when the lower-power network controller 20 wants to transmit the ACK. In this embodiment, the WIFI controller 10 asserted the GNT signal 102 when the transmission of the WIFI packet was complete. Since the GNT signal 102 was asserted prior to the completion of the receipt of the incoming lower-power network packet 300, the lower-power network controller 20 is able to transmit the ACK packet, as illustrated in the figure. This particular scenario may occur in several ways. First, the WIFI packet may have been completed before the lower-power network packet 300, as described above. In another embodiment, the priority of the incoming lower-power network packet 300 may be higher than the priority of the outgoing WIFI packet, as indicated by the PRI signal 103 (see FIG. 1). In this case, the WIFI controller 10 may prematurely interrupt its outgoing packet to allow the lower-power network controller 20 to transmit the ACK packet.

FIGS. 4F-4G show scenarios where the WIFI controller 10 wishes to transmit a WIFI packet while a lower-power network packet 300 is being received. Since the WIFI controller 10 is idle when the lower-power packet 300 is first being received, the GNT signal 102 is asserted by the WIFI controller 10. FIG. 4F shows an embodiment where the priority of the WIFI packet that is to be transmitted is lower than the priority of the lower-power network packet 300 that is being received.

In this embodiment, the WIFI controller 10 simply waits until the lower-power network controller 20 deasserts the REQ signal 101. After this, the GNT signal 102 is deasserted, and the WIFI controller 10 begins transmission of its outgoing WIFI packet.

FIG. 4G shows an embodiment where the priority of the WIFI packet that is to be transmitted is higher than the priority of the lower-power network packet 300 that is being received. In this embodiment, the GNT signal 102 is asserted because, at that time, there is not activity by the WIFI controller 10. However, soon thereafter, the WIFI controller 10 wishes to transmit a packet. Since this WIFI packet has higher priority than the incoming lower-power network packet 300, the GNT signal 102 is deasserted and the WIFI controller 10 begins transmitting the outgoing WIFI packet. Since the GNT signal 102 has been deasserted, the lower-power network controller 20 cannot transmit the ACK packet.

Figure 5A:
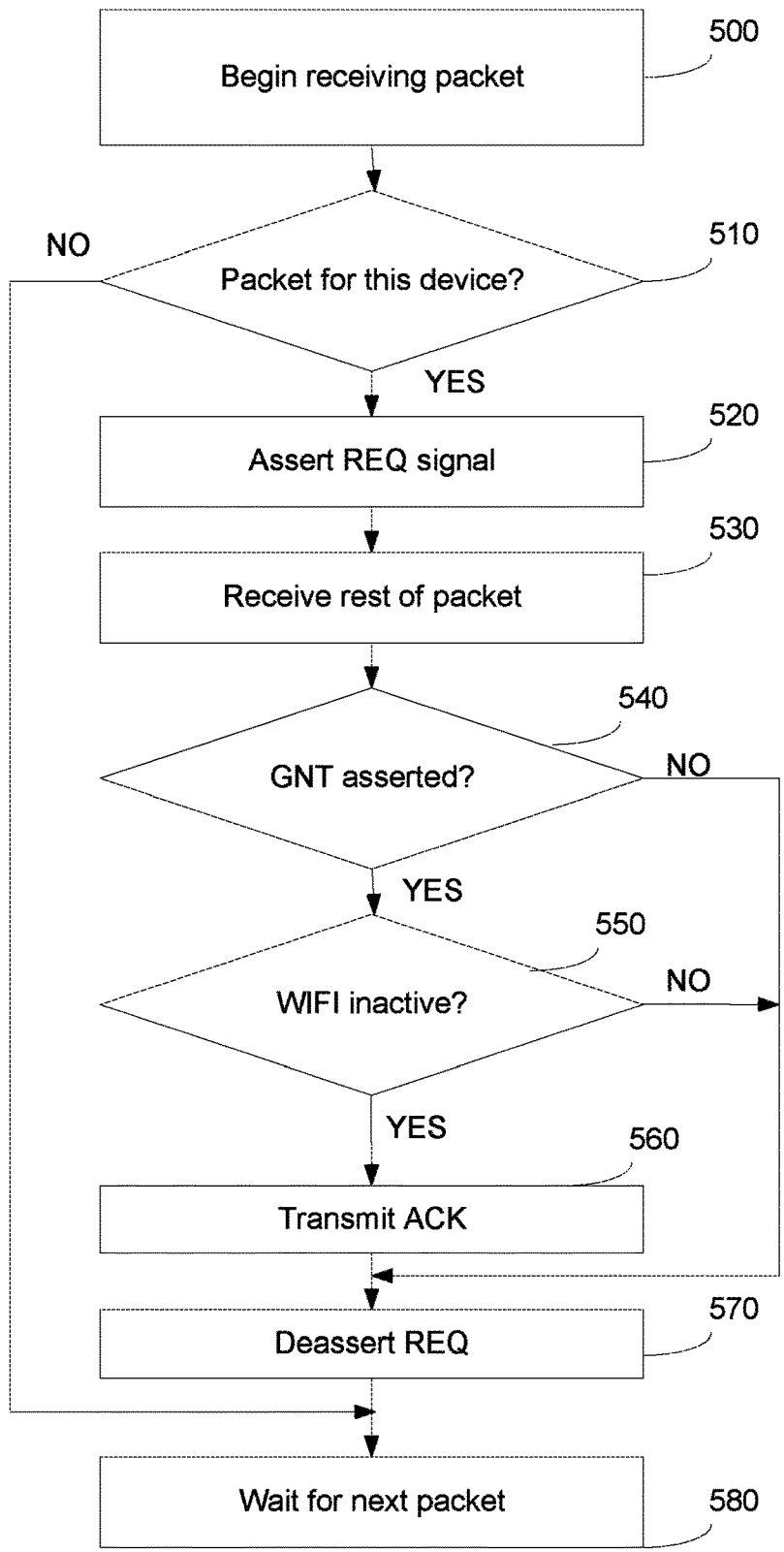
FIG. 5A-5B are representative flowcharts of the receive process for the lower-power network controller.

FIG. 5A shows a first representative flowchart which may be executed by the processing unit 21 in the lower-power network controller 20. This flowchart only pertains to incoming packets. First, as shown in Process 500, an incoming packet begins to be received by the lower-power network controller 20. The lower-power network controller 20 begins receiving the packet and parsing the header information. Specifically, the lower-power network controller 20 parses the destination address 311 in the header 310 to determine if the incoming packet is destined by this device, as shown in Process 510. If the packet is not intended for this device, the lower-power network controller 20 is done with this packet and waits for the next packet, as shown in Process 580. If, however, the packet is intended for this device, the lower-power network controller 20 asserts the REQ signal 101, as shown in Process 520. The lower-power network controller 20 then continues to receive the packet, as shown in Process 530. After the entire packet has been received, the lower-power network device 20 verifies that the packet was correctly received. If so, the lower-power network controller 20 checks if the GNT signal 102 is asserted as shown in Process 540. If it is, then it may transmit the ACK packet. In certain embodiments, the lower-power network controller 20 may determine the status of the WIFI controller 10, such as by querying the STAT signal 104, as shown in Process 550. If the GNT signal 102 is asserted and the STAT signal 104 is not asserted, the lower-power network controller 20 transmits the ACK packet as shown in Process 560. After the ACK is transmitted, the lower-power network controller 20 deasserts the REQ signal 101, as shown in Process 570. If the GNT signal 102 is not asserted, or the STAT signal 104 is asserted, the lower-power network controller 20 deasserts the REQ signal, as shown in Process 570. At this point, the receive process is then complete, and the lower-power network controller 20 waits for the next packet, as shown in Process 580.

Figure 5B:
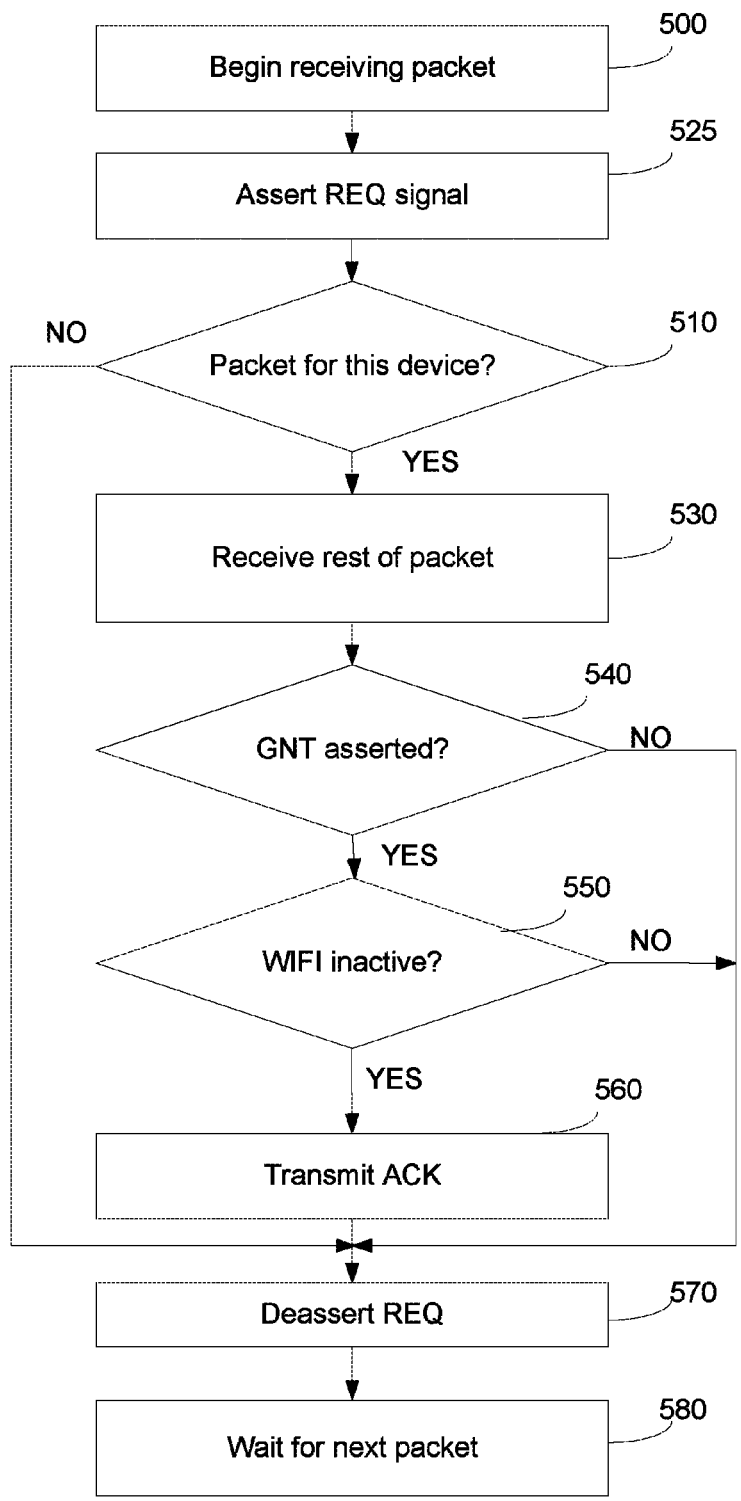

FIG. 5B shows a second representative flowchart which may be executed by the processing unit 21 in the lower-power network controller 20. This flowchart only pertains to incoming packets. This process is similar to FIG. 5A and therefore, only the differences will be described. In FIG. 5B, the lower-power network controller 20 asserts the REQ signal 101 immediately after detecting that an incoming packet is being received, as shown in Process 525. Thus, in this embodiment, the REQ signal 101 is asserted even earlier than it is in FIG. 5A. The sequence then continues as the incoming packet is parsed. When the packet header is received, the lower-power network controller 20 determines whether this packet is for this device, as shown in Process 510. If it is, the sequence continues like that shown in FIG. 5A. If the packet is not for this device, the lower-power network controller 20 deasserts the REQ signal 101, as shown in Process 570.

Figure 6:
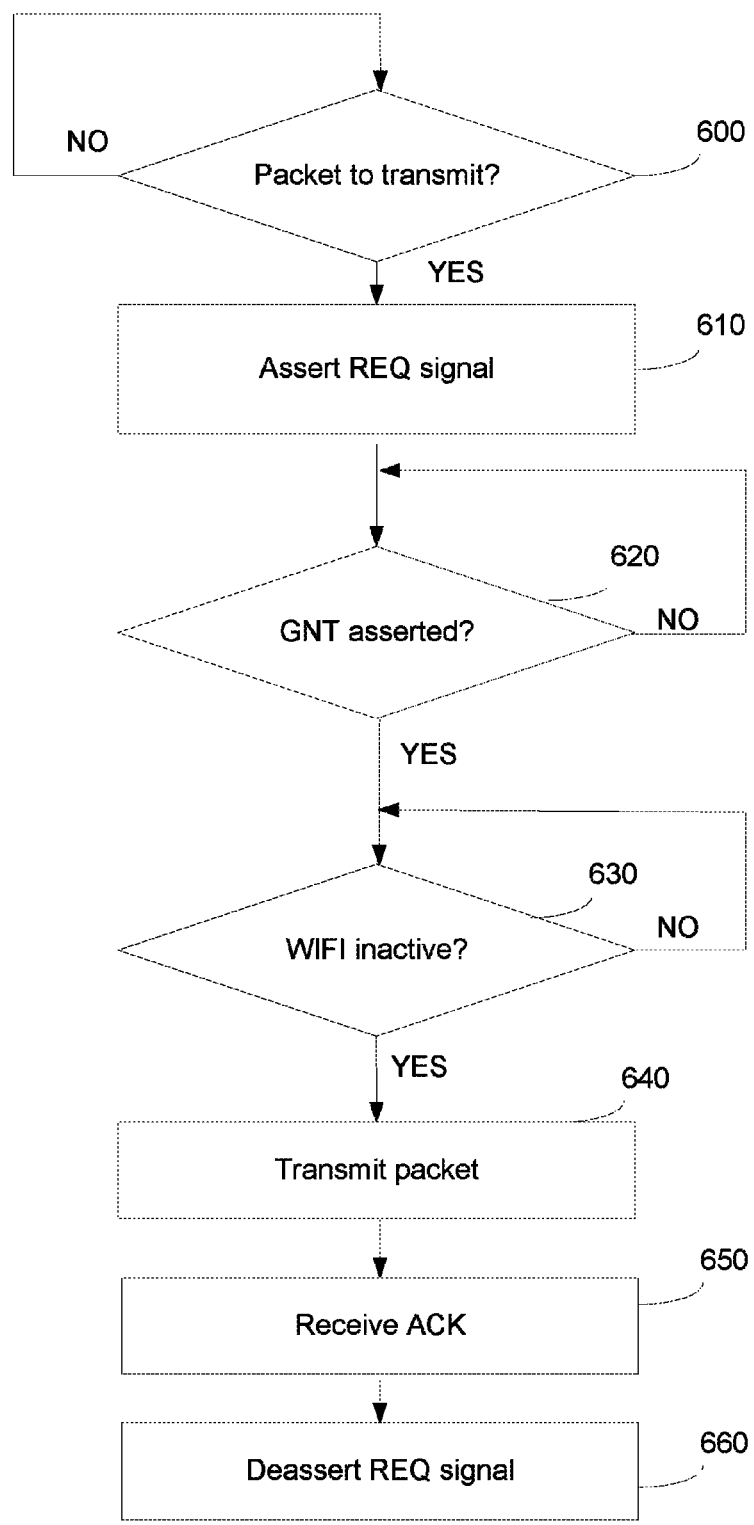
FIG. 6 is a representative flowchart of the transmit process for the lower-power network controller.

The transmit flowchart is shown in FIG. 6 and is much simpler. In this case, the lower-power network controller 20 waits until it has a packet to transmit, as shown in Process 600. When there is a packet, the lower-power network controller 20 asserts the REQ signal 101, as shown in Process 610. The lower-power network controller 20 then waits until the GNT signal 102 is asserted as shown in Process 620. In certain embodiments, the lower-power network controller 20 then checks the status of the WIFI controller 10, as shown in Process 630. If the WIFI controller 10 is currently receiving a packet, the lower-power network controller may wait until the WIFI controller 10 is idle, as shown in Process 630. Of course, in other embodiments, the lower-power controller 20 may only use the GNT signal 102 to determine when to transmit. Once the lower-power network controller 20 determines that the GNT signal 102 is asserted and the STAT signal 104 is not asserted, it transmits the packet, as shown in Process 640. After the packet has been transmitted, the lower-power network controller 20 waits for and receives the ACK packet, as shown in Process 650. Following receipt of the ACK packet, the lower-power network controller 20 deasserts the REQ signal 101, as shown in Process 660.

In certain embodiments, there may be a long delay between when the lower-power network controller 20 has a packet to transmit and when it actually transmits that packet. For example, in certain network protocols, there is a random MAC delay that the transmitting node must wait before attempting to transmit the packet. This random MAC delay is used in an attempt to minimize collisions on the shared medium. This delay may be as long as 10 milliseconds. This may be an unacceptably long amount of time to hold the shared medium. Thus, in some embodiments, there is a delay between the determination that the lower-power network controller 20 has a packet to transmit (Process 600) and the assertion of the REQ signal 101 (Process 610). In certain embodiments, this delay may be a function of the MAC delay.

For example, the lower-power network controller 20 may determine that it has a packet to transmit. It then determines the random MAC delay that it must wait. This random MAC delay is then used to delay the assertion of the REQ signal 101. For example, if the MAC delay is N microseconds, the REQ signal 101 may be asserted after a delay of N-M microseconds, where M is a predetermined value. The value of M may be selected to allow the WIFI controller 10 to receive the REQ signal 101 from the lower-power network controller 20 and return a GNT signal 102, assuming that the WIFI controller 10 is not transmitting at that time. Thus, in certain embodiments, the delay in the assertion of the REQ signal 101 is a predetermined amount of time less than the random MAC delay that will be used. Of course, the delay before the assertion of REQ signal 101 may be determined in other ways, which may or may not be based on the random MAC delay.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
   a WIFI controller, comprising a request signal used as an input to request exclusive access to a shared medium and a grant signal used as an output indicating that the exclusive access to the shared medium has been granted; and
   a lower-power network controller, comprising a processing unit and an associated memory element, wherein the lower-power network controller is configured to:
   determine when there is a lower-power network packet to transmit;
   calculate a random delay to be used by the lower-power network controller prior to attempting to transmit the lower-power network packet on the shared medium; and
   assert the request signal a predetermined amount of time after determining that there is a lower-power network packet to transmit, wherein the predetermined amount of time is determined based on the random delay.

2. The system of claim 1, wherein the predetermined amount of time is less than the random delay by a predetermined value.

3. The system of claim 1, wherein the lower-power network controller is further configured to transmit the lower-power network packet after the random delay only if the grant signal is active.

4. The system of claim 1, wherein the WIFI controller further comprises a status signal used as an output to indicate whether the WIFI controller is active.

5. The system of claim 4, wherein the lower-power network controller is further configured to determine if the WIFI controller is active prior to transmitting the lower-power network packet.

6. The system of claim 4, wherein the lower-power network controller is further configured to not transmit the lower-power network packet if the grant signal is not active or the WIFI controller is active.

7. A method of simultaneously operating a WIFI network and a lower-power network, comprising:
   determining using a lower-power network controller, when there is a lower-power network packet to transmit;
   calculating a random delay to be used by the lower-power network controller prior to attempting to transmit the lower-power network packet on a shared medium; and
   asserting a request signal from the lower-power network controller to a WIFI controller a predetermined amount of time after determining that there is a lower-power network packet to transmit, wherein the predetermined amount of time is determined based on the random delay, and wherein the request signal is used as an input to the WIFI controller to request exclusive access to the shared medium.

8. The method of claim 7, wherein the predetermined amount of time is less than the random delay by a predetermined value.

9. The method of claim 7, wherein the WIFI controller outputs a grant signal if exclusive access to the shared medium has been granted.

10. The method of claim 9, further comprising:
    transmitting, using the lower-power network controller, the lower-power network packet after the random delay only if the grant signal is active.

11. The method of claim 9, wherein the WIFI controller outputs a status signal to indicate whether the WIFI controller is active.

12. The method of claim 11, further comprising:
    determining, using the lower-power network controller, if the WIFI controller is active prior to transmitting the lower-power network packet.

13. The method of claim 11, wherein the lower-power controller does not transmit the lower-power network packet if the grant signal is not active or the WIFI controller is active.

* * * * *